United States Patent [19]

Bawa

[11] Patent Number: 4,702,574

[45] Date of Patent: Oct. 27, 1987

[54] CONTACT LENSES HAVING FLUORESCENT COLORANTS AND APPARATUS FOR MAKING SUCH LENSES

[75] Inventor: Rajan Bawa, Fairport, N.Y.

[73] Assignee: Bausch & Lomb Incorporated, Rochester, N.Y.

[21] Appl. No.: 787,400

[22] Filed: Oct. 15, 1985

[51] Int. Cl.$^4$ .................. G02C 7/04; B29D 11/00; D06P 5/00

[52] U.S. Cl. .................. 351/162; 8/507; 264/1.4; 264/2.1; 351/177; 425/808

[58] Field of Search ................ 351/160 R–162, 351/177; 8/507; 264/1.4, 2.1; 425/808

[56] References Cited

U.S. PATENT DOCUMENTS

| | | | |
|---|---|---|---|
| 2,524,862 | 10/1950 | White | 425/808 X |
| 2,525,664 | 10/1950 | Gadsby et al. | 425/808 X |
| 3,189,914 | 6/1965 | Gusewitch et al. | 351/160 |
| 3,476,499 | 11/1969 | Wichterle | 351/162 X |
| 4,303,701 | 12/1981 | Torgesen et al. | 427/145 |
| 4,468,229 | 8/1984 | Su | 8/507 |
| 4,472,327 | 9/1984 | Neefe | 351/162 X |
| 4,615,593 | 10/1986 | Neefe | 351/162 |

OTHER PUBLICATIONS

Kirk–Othmer "Encyclopedia of Chemical Technology", vol. 14, pp. 546–569—Copyright 1981.
Derwent Patents Index, PLASDOC, Polymer Applications, p. 3; Week 33, 1983.

*Primary Examiner*—John K. Corbin
*Assistant Examiner*—Scott J. Sugarman
*Attorney, Agent, or Firm*—Craig E. Larson; Christopher E. Blank; Bernard D. Bogdon

[57] ABSTRACT

Cosmetic contact lenses, which are tinted with daylight fluorescent pigments in the iris area, can change the wearer's apparent iris color to any desired color, including changing a dark iris to a lighter color such as blue or green.

11 Claims, 9 Drawing Figures

CONTACT LENSES HAVING FLUORESCENT COLORANTS AND APPARATUS FOR MAKING SUCH LENSES

FIELD OF THE INVENTION

This invention relates to contact lenses and more particularly to novel contact lenses which are colored with fluorescent colorants. It also relates to apparatus for making such lenses.

BACKGROUND OF THE INVENTION

The patents of Charles W. Neefe, U.S. Pat. No. 4,460,523 of July 17, 1984 and U.S. Pat. No. 4,472,327 of Sept. 18, 1984, describe methods of making a cosmetic contact lens of novel structure. The lens has an inner circular zone formed of a transparent, colored polymer. Around the circular zone is a concentric annular zone of transparent polymer of the same color as the inner zone in which are dispersed light-reflecting, opaque particles. A second annular zone of clear transparent polymer is formed around the first annulus.

When this novel lens is placed on the eye of a user, the inner circular zone corresponds to the pupil and the first annular zone corresponds to the iris. Although a conventionally tinted contact lens has limited effect on changing the apparent color of the iris, and essentially no effect in lightening the color of dark eyes, in the lens disclosed by Neefe, when light impinges on the reflecting particles dispersed in the colored annular zone, it reflects back as colored light. Consequently, a wearer can have almost any iris color he chooses by wearing such lenses.

Although the novel lenses disclosed in the Neefe patents are pleasing cosmetically, they do have one drawback. This results from the fact that the light-reflecting solid particles in the annular zone are opaque. While the inner zone or pupilar area of the lens contains no opaque particles, the lens wearer is conscious of the opaqueness of the particles in the annular zone of the lens. The quantity of light reaching the wearer's retina through these lenses is reduced by the opaque particles in the annular zone or iris area of the lenses. If the concentration of opaque particles is heavy, as may be desirable in providing, for example, a light blue tint over a dark colored iris, the wearer will experience what can be called a veiling effect. When excessive, this gives the wearer the impression that he is viewing the world through a veil.

SUMMARY OF THE INVENTION

The present invention offers another improvement in tinted lenses. It provides a lens which, like the Neefe lens, can mask the color of a dark iris with a desired lighter color but which avoids or reduces the veiling problem of lenses containing opaque pigments.

The novel lens of the present invention has an inner pupilar zone and a contiguously surrounding annular iris zone. Both of these zones are formed of a transparent material. At least a part of the annular zone is colored by a colorant which fluoresces in daylight.

The invention also includes novel apparatus for making lenses of the invention, such apparatus comprising a rotating contact lens mold and, positioned over the mold, an irradiation mask in the form of a hollow, inverted, truncated cone or pyramid, the mask having an aperture at its truncated end positioned near the upper surface of the mold and having at least one horizontal slot-like aperture in its wall.

DETAILED DESCRIPTION OF THE INVENTION

The invention will be illustrated and described in more detail by reference to the drawings of which FIG. 1 is diagrammatic plan view of a cosmetic contact lens of the invention.

Figure 1:
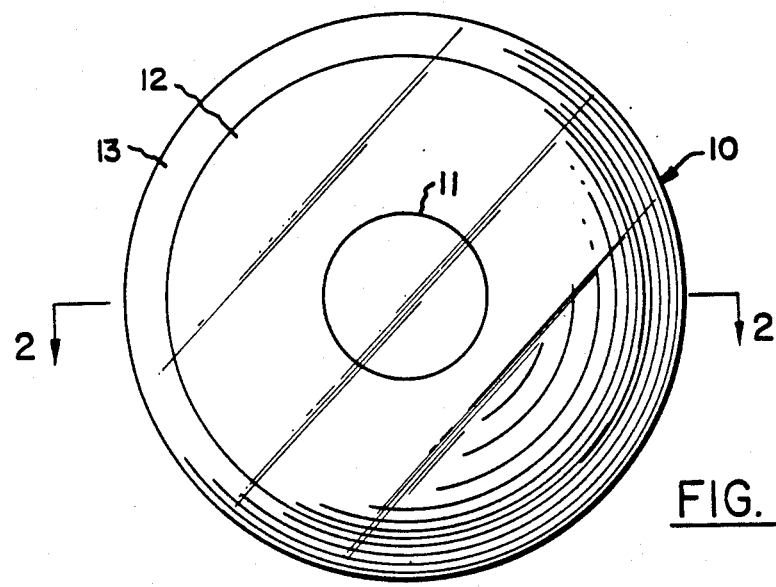
Figure 2:
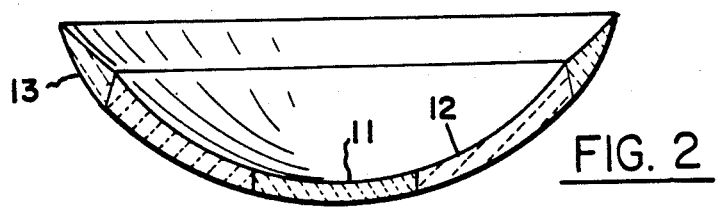
FIG. 2 is a diagrammatic side view in section along line 2—2 of FIG. 1.

FIGS. 1 and 2 show a plastic contact lens 10 of the invention, having an inner zone 11, a first annular zone 12 and a second or peripheral annular zone 13. Zone 11 in the embodiment of FIG. 1 is a circular, transparent zone at the center of the lens. It corresponds approximately to the pupil of the wearer's eye and preferably is free of any colorant, either fluorescent or non-fluorescent.

Contiguously surrounding the inner zone 11 is the annular zone 12 which corresponds approximately to the iris of the eye. For the purpose of this specification, zones 11 and 12 together are called the optical zone of the lens. Unlike the Neefe lenses previously mentioned, zone 12 contains a dye or pigment which fluoresces in daylight. Preferably, both zone 11 and zone 12 are free of opaque particles, zone 11 being transparent and zone 12 being translucent and colored only by a fluorescent colorant. If desired, however, either to improve the masking of the actual iris color or to reduce the amount of fluorescent pigment required, an opaque pigment such as $TiO_2$ or micaparticles can be included in Zone 12.

The peripheral annular zone 13 is optional but, when used, preferably is transparent, clear polymer containing no colorant. If desired, it can contain a fluorescent or non-fluorescent pigment, a white reflective pigment such as $TiO_2$ being especially appropriate since zone 13 overlies the sclera of the eye.

The contact lenses of the present invention can be either soft lenses or hard lenses or they can be hybrid lenses which have both hard and soft segments, e.g., a hard central segment and a soft peripheral segment. Soft lenses and soft segments of hybrid lenses are normally made of sparingly crosslinked polymeric hydrogels. As is well known in the art, these are made by polymerizing a monomer such as 2-hydroxyethylmethacrylate or N-vinyl-pyrrolidone using a crosslinking agent such as ethyleneglycol dimethacrylate. The lens is hydrated to the desired hydrogel form by soaking in isotonic saline solution. The hydrated lens contains, for example, from 30 to 90 weight percent water.

Especially useful hydrogel polymers are crosslinked polymers made from the following monomers or mixtures of monomers:

2-hydroxyethyl methacrylate (also known as HEMA)
HEMA with methacrylic acid
HEMA with 1-vinyl-2-pyrrolidinone
HEMA with 1-vinyl-2-pyrrolidinone and methacrylic acid HEMA with 1-vinyl-2-pyrrolidinone and methyl methacrylate HEMA with N-(1,1-dimethyl-3-oxobutyl) acrylamide
1-Vinyl-2-pyrrolidinone with methyl methacrylate and allyl methacrylate Preferred crosslinking agents for these monomers include divinylbenzene, 1,3-propandiol dimethacrylate and ethylene glycol and poly(ethylene glycol) dimethacrylates.

Hard lenses are made from glass or from various transparent, acrylic or cellulosic polymers such as polymethylmethacrylate and cellulose acetate butyrate. Acrylic polymers are especially useful. Illustrative acrylic monomers are methyl methacrylate, ethyl methacrylate, isopropyl methacrylate, s-butyl methacrylate, t-butyl methacrylate, phenyl methacrylate, cyclohexyl methacrylate, 3,3,5-trimethylcyclohexyl methacrylate t-butyl acrylate, tetrahydrofurfuryl methacrylate, allyl methacrylate, cyclohexyl acrylate, tetrahydrofurfuryl acrylate and others. Other useful monomers include vinyl monomers which contain silyl groups, such as siloxanylalkyl vinyl acetate ester monomers such as disclosed in the patent to Ivani, U.S. Pat. No. 4,410,674, of which bis(methacryloxybutyl) tetramethyl disiloxane is an example.

Also usable are copolymers formed by combining two or more vinyl monomers. If desired, crosslinking monomers may be added, such as ethylene glycol dimethacrylate, ethylene glycol diacrylate, pentaerythritol tetraacrylate and trimethylolpropane trimethacrylate. Preferably, from 70 to 100 percent by weight of the vinyl polymer is formed from one or more of methyl methacrylate, tetrahydrofurfuryl methacrylate and cyclohexyl methacrylate and from 0 to 30 percent by weight of one or more of ethylene glycol dimethacrylate, diethylene glycol dimethacrylate, triethylene glycol dimethacrylate or tetraethylene glycol dimethacrylate.

In the vinyl monomer compositions a free radical polymerization catalyst preferably is included. Examples include benzoin methyl ether, dibenzoyl peroxide and azobisisobutyronitrile. The vinyl polymerization normally is exothermic and no heat need be supplied to promote polymerization. In order to avoid too rapid curing or polymerization of the monomer, it may also be desirable to include in the monomer mix a small amount, e.g., 5-40 ppm of a polymerization inhibitor such as hydroquinone.

The fluorescent colorants used in the lenses of the present invention include fluorescent pigments and fluorescent dyes. The preferred colorants are the so-called daylight fluorescent pigments. These are transparent organic resin particles containing dyes which are capable of fluorescing while in a solid state solution in the carrier resin. They not only are colored in the ordinary sense, i.e., they reflect certain wavelengths of visible light, but they also absorb ultraviolet or visible light of short wavelength and emit visible light, usually of a somewhat longer wavelength. The result is a high degree of apparent reflectance. Substrates containing such pigments even appear to glow.

Fluorescent pigments are made by dissolving a fluorescent dye in the carrier resin at concentrations that allow maximum fluorescence and then grinding the resin to a fine powder, e.g., of particle size in the range from 1.75 to 20 m. Suitable carrier resins include melamine formaldehyde and triazine formaldehyde resins modified with aromatic sulfonamide resins. The carrier resins are glass-like in consistency and so brittle that they can be ground to a very fine consistency. Other suitable carriers include polyesters and polyamides, e.g., a polyester of trimellitic anhydride, propylene glycol and phthalic anhydride and a polyamide of isophoronediamine and isophthalic acid.

The dyes used in fluorescent pigments are mainly of the type 4-aminonaphthylamide (yellow) or rhodamine (red - blue/red), either singly or in admixture. Examples of specific fluorescent dyes are as follows:

| Chemical or Commercial Name | Color Index Name | Number |
|---|---|---|
| Rhodamine B Extra | Basic Violet 10 | — |
| Rhodamine 6GDN Extra | Basic Red 1 | — |
| Brilliant Yellow 6G Base | Solvent Yellow 44 | 56200 |
| Rhodamine BDC | — | — |
| Rhodamine B | Solvent Red 49 | 45170 |
| Fluorol 5G | Solvent Green 4 | 45550 |
| Fluorol Green Gold | Solvent Green 5 | 59075 |
| Thioindigo | Vat Red 41 | 73300 |
| 7-Hydroxycoumarin | — | — |
| Fluorescein | — | — |
| 7-Diethylaminocoumarin | — | — |
| Coumarin 7 | — | — |
| Xylene Red B | Acid Red 52 | — |

Another kind of fluorescent dye, in addition to the daylight fluorescent dyes, is the class of so-called optical brighteners or fluorescent whitening agents. These are organic compounds which absorb ultraviolet radiation in the range from about 300 to 400 nm and emit in the blue range, e.g., at around 440 nm. The daylight fluorescent pigment used in the lenses of the present invention can contain such optical brightener dyes. For example, a blue or green daylight fluorescent pigment can contain a non-fluorescent phthalocyanine dye or pigment in admixture with an optical brightener or with yellow fluorescent dyes. The resultant colors are more brilliant than those obtained with the blue pigment alone. Examples of chemical structures of optical brighteners include the following:

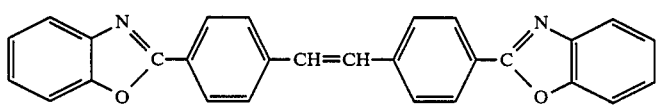

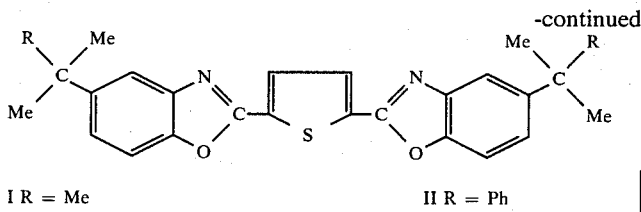

I R = Me     II R = Ph

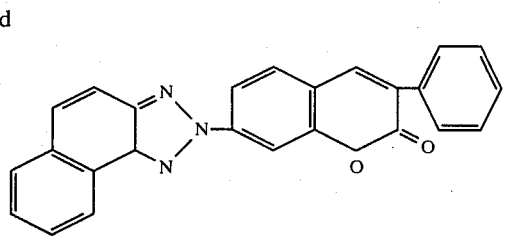

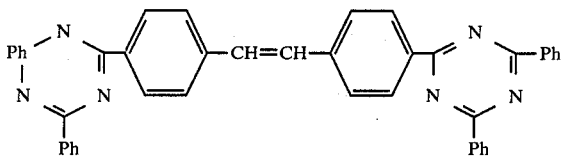

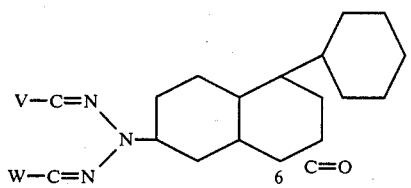

V & W = C$_{1=15}$

Although many of the commercially available daylight fluorescent pigments have colors such as orange, yellow and red that might not be desirable for contact lens tinting, they can be blended with other fluorescent or non-fluorescent dyes or pigments to provide desired colors such as blue, green and brown. Although addition of a non-fluorescent dye or pigment may reduce the fluorescence of the daylight fluorescent pigment somewhat, sufficient fluorescence remains for the purpose of the present invention. As examples of such mixtures, a semi-fluorescent green color can be obtained by tinting the Day-Glo "Saturn Yellow" pigment with phthalocyanine green pigment. A semi-fluorescent purple is obtained by tinting the Day-Glo "Aurora Pink" pigment with phthalocyanine blue pigment. In some instances, as already mentioned, the commercially available daylight fluorescent pigment may itself contain a blend of two or more dyes or pigments.

The described daylight fluorescent pigments can readily be blended with contact lens monomers. They are, therefore, quite useful as fluorescent colorants for making the lenses of the invention. Instead of using pigments, however, the fluorescent colorants for the lenses can be fluorescent dyes. The dye compounds can be incorporated in the monomer when casting the lens or the finished lens can be tinted by treatment with a fluorescent dye such as by soaking in or coating with a dye solution. Suitable dyes include reactive dyes which react with the lens polymer. Other suitable dyes include monomeric dyes which copolymerize with the lens monomer as the lens is being cast or molded. As with pigments, the dye solutions can include mixtures of fluorescent dyes or of fluorescent and non-fluorescent dyes.

The most preferred daylight fluorescent colorants for lenses of the invention are those which in daylight emit radiation of wavelengths in the range from about 400 to about 530 nm, i.e., in the blue to green range. This is the range of iris colors which is difficult or impossible to achieve with conventional tinted contact lenses when the wearer's natural iris color is dark. However, the lenses of the invention can contain fluorescent colorants of any color which may be desired for cosmetic or other purposes.

An especially suitable class of fluorescent pigments for the lenses of the invention is a class of pigments known as the Day-Glo Series of pigments supplied by Day-Glo Color Corp. of Cleveland, Ohio. Preferred are the pigments of the Day-Glo A Series which are reported to be non-cytotoxic and non-irritating to the eye.

The incorporation of the fluorescent colorant with the lens material can be accomplished in any manner that provides sufficient fastness of the colorant and that avoids irritation or injury to the eye. Colorants such as the Day-Glo A Series, which are non-cytotoxic and non-irritating to the eye, can be dispersed within the lens polymer; for instance, by mixing the colorant with the lens monomer before it is polymerized. Preferably, the fluorescent colorant is uniformly dispersed in the part of the lens that is to be colored, although, if desired for cosmetic effects, an irregular dispersion can be used.

When a colorant such as Day-Glo A Series is mixed with the lens monomer in this manner, the concentration of colorant preferably is in the range of about 0.2 to about 8 weight percent, based on the weight of polymer in the colored segment of the lens. For the colorants of Day-Glo A Series, this concentration in a transparent hydrogel lens such as polymacon, which is a crosslinked poly HEMA hydrogel, provides an optical density sufficient to mask a dark colored iris and reflect or emit a lighter color.

Although dispersion of the fluorescent colorant within the polymer is a preferred way of incorporating the colorant with the lens, it is not the only way. One or both surfaces of the lens can be imprinted or otherwise coated with a fluorescent dye which fixes to the polymer.

When the colorant is applied to the surface of the lens, preferably it is applied only to the anterior surface in order to avoid possible transfer to the cornea. However, if the dye is sufficiently fast in its association with the lens polymer and if it otherwise causes no irritation to the eye, it can be applied to the posterior surface of the lens. In either event, the amount of dye will be that which provides an optical density equivalent to that obtained by mixing about 0.2 to about 8 weight percent of Day-Glo A Series colorants in the lens polymer.

Although the use of fluorescent colorants in accordance with the invention will change the apparent color of an iris without substantially interfering with vision, that is, without causing an excessive veiling effect, the reasons for the improvement over opaque pigments are not entirely clear. We do not wish to be bound by any theoretical explanation, but one reason appears to be that the particle size of the fluorescent pigments and dye are much smaller than that of the opaque pigments. For example, the Day-Glo A Series colorants have a particle size in the range of 1.75 to 20 m. In contrast, agglomerates of titanium dioxide, the preferred opaque pigment, have a particle size, in the range from 7 to 120 m. Thus, even when used in the same or a higher weight percent concentration than the opaque pigments, the fluorescent colorants do not obscure the lens wearer's vision or obscure it less than do opaque particles such as titanium dioxide.

By using a fluorescent colorant, the desired masking of iris color is achieved without undesirably impairing the lens wearer's vision. With such compounds of the indicated particle size and concentration, the lens remains translucent in the colored area and the wearer is not conscious of any veiling effect.

In fact, the light transmission of the lens in the colored area is so good it is possible to incorporate the fluorescent colorant in the entire optical zone of the lens. Although the fluorescent material has color, the pupilar area of the lens will appear almost as dark as the pupil of the eye, since there is no reflection through the lens from the pupil. For the most natural cosmetic effects, however, in lenses of the present invention the central segment corresponding to the pupil contains no fluorescent colorant.

Elimination or reduction of the veiling effect is not the only advantage of using fluorescent colorants instead of opaque reflective particles in the lenses of the present invention. Another advantage is in the lens fabrication procedure. Whereas opaque inorganic pigments are difficult to disperse uniformly in the monomer during the casting of contact lenses, various organic fluorescent pigments of small particle size are relatively easy to disperse. They are easily suspendable in the monomer, they do not precipitate out of suspension as quickly and they do not agglomerate as do pigments such as titanium dioxide. Thus they maintain their original small particle size and form no opaque clumps. Furthermore, when using fluorescent colorants, it is necessary to add only the one colorant to the lens polymer instead of adding both a colorant and reflective particles as in the other type of lenses which mask the natural iris color.

Another advantage is that since the lenses containing the fluorescent particles are translucent, the natural iris variegation of the wearer usually shows through to give a natural appearance. Also, the effect of depth and moistness is produced as in a natural eye, without the shift in plane of iris color from iris to cornea giving an unnatural appearance.

The preferred lenses of the invention have a clear central pupilar area, a clear peripheral area and an intermediate annular area which contains the fluorescent colorant. FIGS. 1 and 2 of the drawing show such a lens. Lenses of this kind can be made by more than one method. One method, for example, is to imprint the annular iris area of a preformed lens with the desired fluorescent dye. Another method is by casting plastic rods with concentric zones of the different compositions and then slicing the rod into discs or buttons from which lenses are lathed. The latter is disclosed, for example, in the previously cited patents of C. W. Neefe, U.S. Pat. Nos. 4,460,523 and 4,472,327.

While the Neefe method and other methods are useful, a preferred method of making the lenses of the present invention is by casting them in contact lens molds using masked U.V. exposure to initiate polymerization. This preferred method can be described by reference to FIGS. 3-7 and 9 of the drawing.

Figure 3:
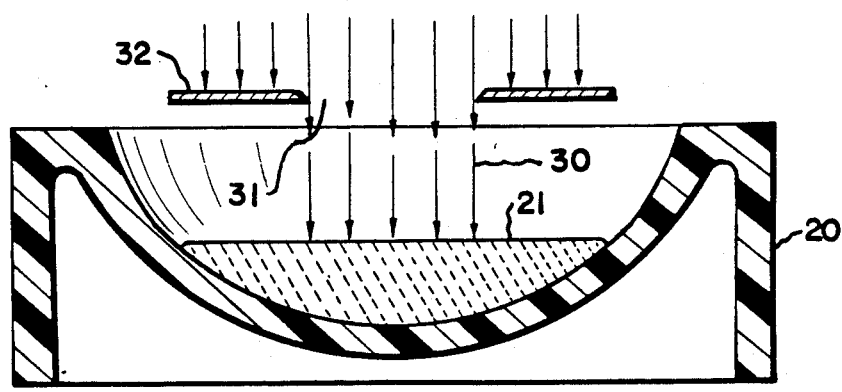
FIGS. 3-7 illustrate steps in one method of preparing lenses of the invention.

FIG. 3 shows a contact lens mold in cross-section during a first step in making a lens of the invention by this method, the clear central part of the lens being formed by placing on the concave surface of plastic mold 20 a quantity of a polymerizable monomer composition 21 which is free of fluorescent colorants. The monomer can be any contact lens monomer such as HEMA or a mixture of HEMA and PVP if a soft lens is to be made or methyl methacrylate if a hard lens is to be made. The monomer composition will also contain a polymerization catalyst, of which various free radical initiators are preferred. It can also contain any of the various optional ingredients such as a non-volatile, inert diluent, a small amount of polymerization inhibitor, a non-fluorescent colorant, or even a fluorescent colorant if, instead of having a clear central zone, it is desired that the entire optical zone of the lens, or the entire lens, be fluorescent.

The monomer composition 21 spreads to form a layer on the surface of the mold. It can spread simply by gravitational flow, as illustrated in FIG. 3, or it can be spread centrifugally by spinning mold 20 about a vertical axis through the center of its concave surface.

A central portion of the liquid monomer 21 is then subjected to ultraviolet radiation 30 from a source, such as a sun lamp, not shown in the drawing. The radiation passes through an aperture 31, which preferably is circular, in an opaque mask 32. For best results, the exposed part of the monomer is uniformly irradiated. This contributes to uniformity of the resulting polymer and reduces stresses in the lens. Uniformity can be achieved conveniently by collimating the radiation.

In manufacturing hydrogel contact lenses, it is desirable to prevent swelling and deformation of the lens during hydration by including an inert diluent in the hydrogel monomer composition. In the three dimensional crosslinked polymer the diluent occupies space that subsequently is occupied by water. When the lens is hydrated, water or saline solution replaces the diluent and the lens does not adversely change its dimensions when hydrated. Preferred diluents are non-volatile, inert liquids such as diethylene glycol monobutyl ether and glycerine. Other possible diluents include the solid diluents disclosed in the patent to Erikson, U.S. Pat. No. 4,121,885.

Figure 4:
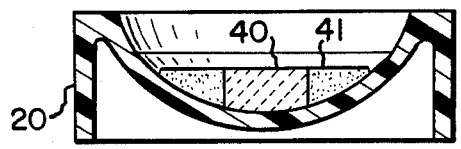

As shown in FIG. 4, the irradiated central portion forms a solid polymer 40 while the peripheral portion 41 remains liquid. The degree of polymerization of the central portion at this stage can vary. It can be polymerized to a high molecular weight polymer during this stage or, if desired, it can be polymerized only enough to retain its desired shape and to separate it from the unpolymerized liquid monomer. In the latter event, the central portion can be more fully polymerized in a later stage.

Figure 5:
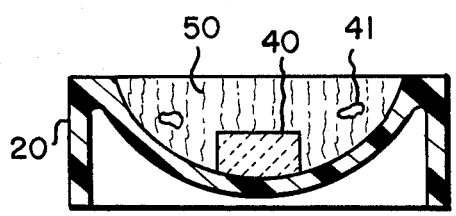

FIG. 5 shows the next step. A quantity of a second monomer composition 50 containing a fluorescent colorant, a catalyst and other optional ingredients previously mentioned is placed in the mold in contact with the polymer 40. The second monomer can be the same as the first or a different copolymerizable vinyl monomer. For instance, the first can be an acrylic monomer for a relatively hard central segment while the second is a monomer for a soft hydrogel polymer. In any event, a component of the second monomer composition is the fluorescent colorant. In the particular embodiment illustrated by FIG. 5 the second monomer is of higher density than the first monomer. Consequently, when the second monomer is injected into the mold, the unpolymerized portions 41 of the first monomer are displaced by or blended with the second monomer in the peripheral region surrounding polymer 40. As shown in FIG. 5, the periphery fills with monomer 50. The mask 33 having been withdrawn, the entire surface of the mold is then exposed to uniform ultraviolet radiation. This causes polymerization of the second monomer and the formation of a composite polymeric article having a central clear segment 40 and an annular segment 50 which contains a fluorescent colorant.

Figure 7:
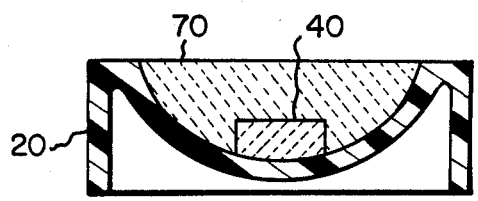
Figure 8:
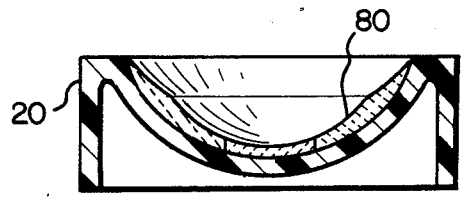
FIG. 8 is a diagrammatic view in section of a lens of the invention.
Figure 6:
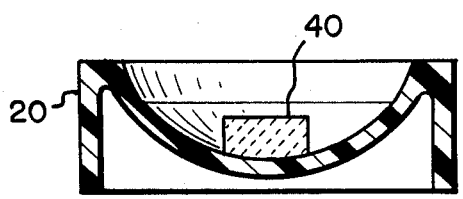

It is also possible to remove the first monomer from the mold, e.g., by aspiration with a micropipette, before introducing the second monomer. This is especially useful when the second monomer is less dense than the first. After removal of unpolymerized liquid monomer, the polymerized central segment 40 of the first monomer remains in the mold as shown in FIG. 6. Then, as shown in FIG. 7, a quantity of the second monomer 70 is placed in the mold, and the latter is polymerized in the manner described in connection with FIG. 5. To form a contact lens from the composite articles of FIGS. 5 and 7 two further steps are needed. First, the excess polymer is cut away from the upper surface of the composite article to form the posterior concave surface of contact lens 80 in FIG. 8. Subsequently, if the lens or any segment of it is a hydrogel, it is soaked in a saline solution in conventional manner to hydrate its hydrogel portion.

A stationary mold has been described. It is also possible to spin the mold, as in the well-known spincasting technique, for one or more stages of the method. Preferably the mold is spun at least in the second stage, i.e., when the monomer for the peripheral region is introduced and polymerized. The reason for this is that in a concave mold, such as shown in the drawings, if the mold is not spun a large volume of the second monomer must be introduced to cover the central zone polymer and to spread over the full extent of the peripheral zone. The mass of the second monomer is then several times greater than that of the first monomer.

A way to avoid this problem is to use only a small amount of the second monomer and then to spin the mold to spread the monomer in a thin layer over the desired extent of the peripheral region of the lens. By using less of the second polymer, less is wasted when the lens blank is lathed or otherwise trimmed and polished to form the final lens.

Figure 9:
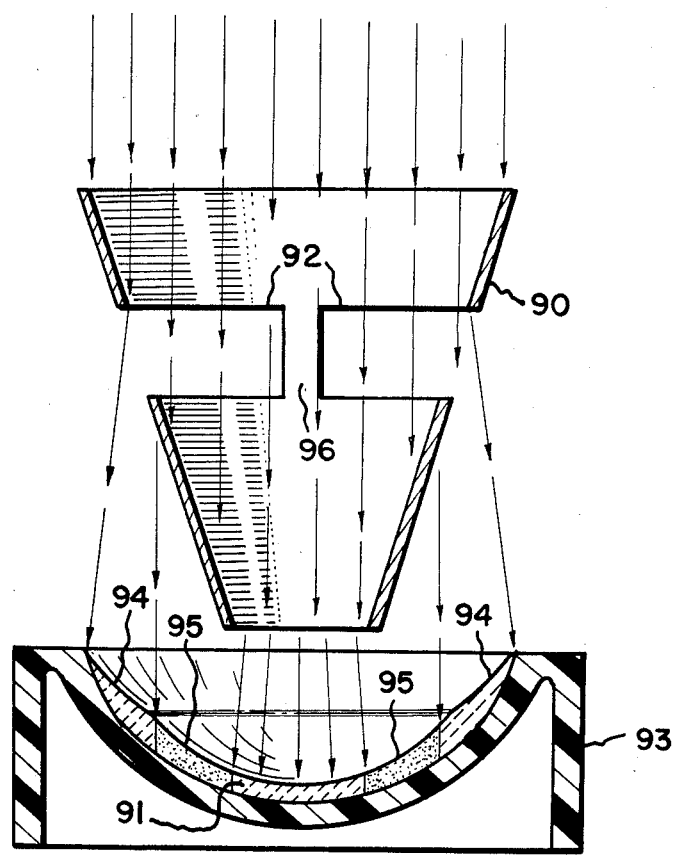
FIG. 9 is a diagrammatic side view in section of a novel combination of a rotating mold and a conical irradiation mask used in making the novel lenses.

Although the planar mask shown in FIG. 3 is advantageous for economic reasons, another mask in accordance with the invention is preferred when the most precise positioning of the irradiated area is desired. As shown in FIG. 9, the mask is an inverted, truncated hollow cone 90 and is made of metal or other material which is opaque to the UV or other actinic radiation. This structure makes it possible to focus the circular pattern of irradiation precisely on the area of the monomer surface 91 where it is desired.

The use of either a conical or a planar mask with only a central circular aperture is useful for making the type of lens of the invention which has only two zones, e.g., a central colorless zone and one tinted annular zone. However, for making the kind of lens illustrated in FIG. 1 which has not only a colorless central zone and a tinted iris zone but also a colorless peripheral zone, another kind of mask is desirable. Such a mask is illustrated in FIG. 9. It is provided with an annular slot 92 in the wall of the cone which permits the irradiation of an annular peripheral region of the monomer. With a mask having such an annular slot a rotating mold 93 is used and two regions of the first monomer mix polymerize initially, i.e., the central circular region 91 and the annular peripheral region 94, the latter being the area that is irradiated through the annular slot 92.

In a preferred embodiment, the first monomer mix contains no colorant. Consequently, when the monomer is irradiated by use of a mask as in FIG. 9, both the circular region and the peripheral region are formed of clear polymer. When the second monomer mix, which contains a fluorescent colorant, is injected into the mold, it fills in the intermediate annular region 95. The mask is removed and the full surface of the contents of the lens mold is irradiated to cure or polymerize the second monomer in region 95. The resulting lens, after lathing, is then of the structure shown in FIG. 1, having a clear pupilar area in the center, a tinted intermediate iris zone and a clear peripheral scleral zone.

In the slotted cone type of mask shown in FIG. 9, for structural reasons the slot is not continuous but is interrupted by two or more sections 96 in the wall of cone 90. Consequently, the mold 93 is spun or rotated in order that the entire peripheral region of the first monomer mix will receive the actinic irradiation uniformly. When the mold is rotated at the usual speeds for spincasting of lenses, centrifugal force spreads the monomer on the concave surface of mold 93, as shown in FIG. 9.

Although FIG. 9 shows the slotted mask in the form of a cone other shapes can perform a similar function. Another suitable form is an inverted, truncated, hollow pyramid, wherein the open truncated end forms an aperture for irradiating the circular central area of the mold surface and wherein the wall of the pyramid has one or more slots, like the slots 92 in wall of the conical mask 90 of FIG. 9.

If the mask is a truncated, inverted, hollow pyramid, it can have any desired number of sides and the irradiation aperture formed by truncating the pyramid will be a polygon instead of circle. Because the mold rotates, the irradiated area will be circular. The irradiation, however, will be less intense on the periphery than at the middle of the circular area. This can be advantageous when forming a hybrid lens because the peripheral area can be less highly polymerized than the central area and, therefore, more adaptable to copolymerization and bonding with the second monomer composition which is introduced into the mold in the annular or iris area surrounding the polymerized central zone.

Likewise, when the mask is a pyramid having horizontal irradiation slots in its walls, since the mold is rotating, a peripheral annular area of the mold surface is irradiated. Again, the inner edge of that annular area will be less intensely irradiated and hence less polymerized than the middle part when the slots are in the wall of a pyramid. This can improve the bonding of that peripheral region of polymer to the middle annular region.

The novel lenses of the invention include those in which the color is provided solely by the fluorescent colorant. The invention also includes lenses which contain both fluorescent and non-fluorescent colorants. A preferred lens of that kind has a non-fluorescent colorant dispersed throughout the optical zone, i.e., both the central pupilar zone and the annular iris zone. The fluorescent colorant, however, is dispersed only in the annular iris zone. In this embodiment the fluorescent and non-fluorescent colorants in the annular iris zone augment each other and mask the iris color of the eye very effectively. Another benefit is that by including the same non-fluorescent colorant in both the central zone and the annular zone, the wearer is not disturbed by any apparent difference in color between that zone and the surrounding annular zone.

By using two or more fluorescent colorants together, it is possible to obtain colors more brilliant than one dye alone could produce. In effect, one colorant acts as a sensitizer for the other.

The following example illustrates the making of contact lenses in accordance with the invention:

EXAMPLE I

A soft hydrated, uncolored polymacon contact lens was soaked for 40 minutes in a buffered saline solution treated with sodium fluorescein strips. The resulting tinted lens was then placed on the eye of a patient with a dark brown iris. When the tinted lens was in place, the eye appeared to have a green iris. The patient discerned no interference with vision.

EXAMPLE II

Another polymacon contact lens was made by polymerizing and a contact lens mold a HEMA monomer mix, i.e., a contact lens monomer mix containing principally 2-hydroxyethyl methacrylate. Included in the mix was sodium fluorescein which copolymerized with the HEMA. The resulting polymer was tinted and the lens formed from it had iris-masking capability similar to that of the lens of Example I.

EXAMPLE III

With a polymacon monomer mix was blended a quantity of the daylight fluorescent pigment known as Horizon Blue pigment of the Day-Glo A Series. The pigment did not agglomerate. It formed a clear dispersion in the monomer. The resulting tinted monomer mix was then polymerized in a contact lens mold by exposure to ultraviolet radiation for 30 minutes in a nitrogen atmosphere. The polymerized lens was then hydrated in a buffered saline solution. The hydrated tinted lens had masking properties similar to those of the lens of Example I.

EXAMPLE IV

With a polymacon monomer mix was blended 4% by weight of the daylight fluorescent pigment known as "Horizon Blue" pigment of the Day-Glo A Series. The pigment did not agglomerate. It formed a clear dispersion in the monomer. (Call this solution X.) In another quantity of polymacon monomer mix was dissolved 20 ppm of hydroquinone as inhibitor. (Call this solution Y.) Solution Y (30 microliters) was then placed in a spinning optical mold and the central pupil area cured by UV under nitrogen for 5 minutes after the liquid surface was in equilibrium. Next, solution X (50 microliters) was injected into the spinning mold and both solutions cured by UV under nitrogen for 5 minutes. The mold with the cured polymer was then subjected to a postcure by UV under nitrogen for 20 minutes. The resulting button was then lathed to obtain a lens having a central clear area and a surrounding annular area tinted with the fluorescent pigment.

Although the invention has been described in detail with reference to preferred embodiments, variations and modifications can be made within the spirit and scope of the invention as described above and as claimed.

The following is claimed:

1. A contact lens comprising an optical zone, at least a portion of the optical zone being colored by a fluorescent colorant compound which fluoresces visibly in daylight.

2. A lens according to claim 1 in which the optical zone comprises a central pupilar zone which is substantially free of fluorescent colorant and a contiguously surrounding annular iris zone which is colored by fluorescent colorant.

3. A lens according to claim 2 in which the lens is a polymeric hydrogel lens.

4. A lens according to claim 3 in which the fluorescent colorant emits in the range from about 400 to 530 nm when exposed to daylight.

5. A lens according to claim 3 in which the central pupilar zone is circular.

6. A lens according to claim 5 in which the lens also has an annular transparent peripheral zone which is free of colorants.

7. A lens according to claim 1 in which the fluorescent colorant is dispersed in at least a portion of the polymer of the optical zone.

8. A lens according to claim 7 in which the fluorescent colorant is uniformly dispersed throughout the optical zone.

9. A lens according to claim 1 in which at least a portion of the optical zone is also colored by a non-fluorescent colorant compound.

10. A lens according to claim 9 in which the non-fluorescent colorant compound reflects at about the same wavelength as the emission of the fluorescent colorant compound.

11. Apparatus for making contact lenses which comprises
    a rotatable contact lens mold having a concave upper surface adapted to receive a monomer composition for polymerization
    and, positioned above the mold, an opaque mask in the form of an inverted, truncated, hollow cone or pyramid, the truncated lower end of the mask defining an aperture for irradiation of a circular central area of the surface of the mold and the wall of said mask having at least one horizontal slot defining an aperture for irradiation of a peripheral annular area of the surface of the mold.

* * * * *